Patented Aug. 27, 1929.

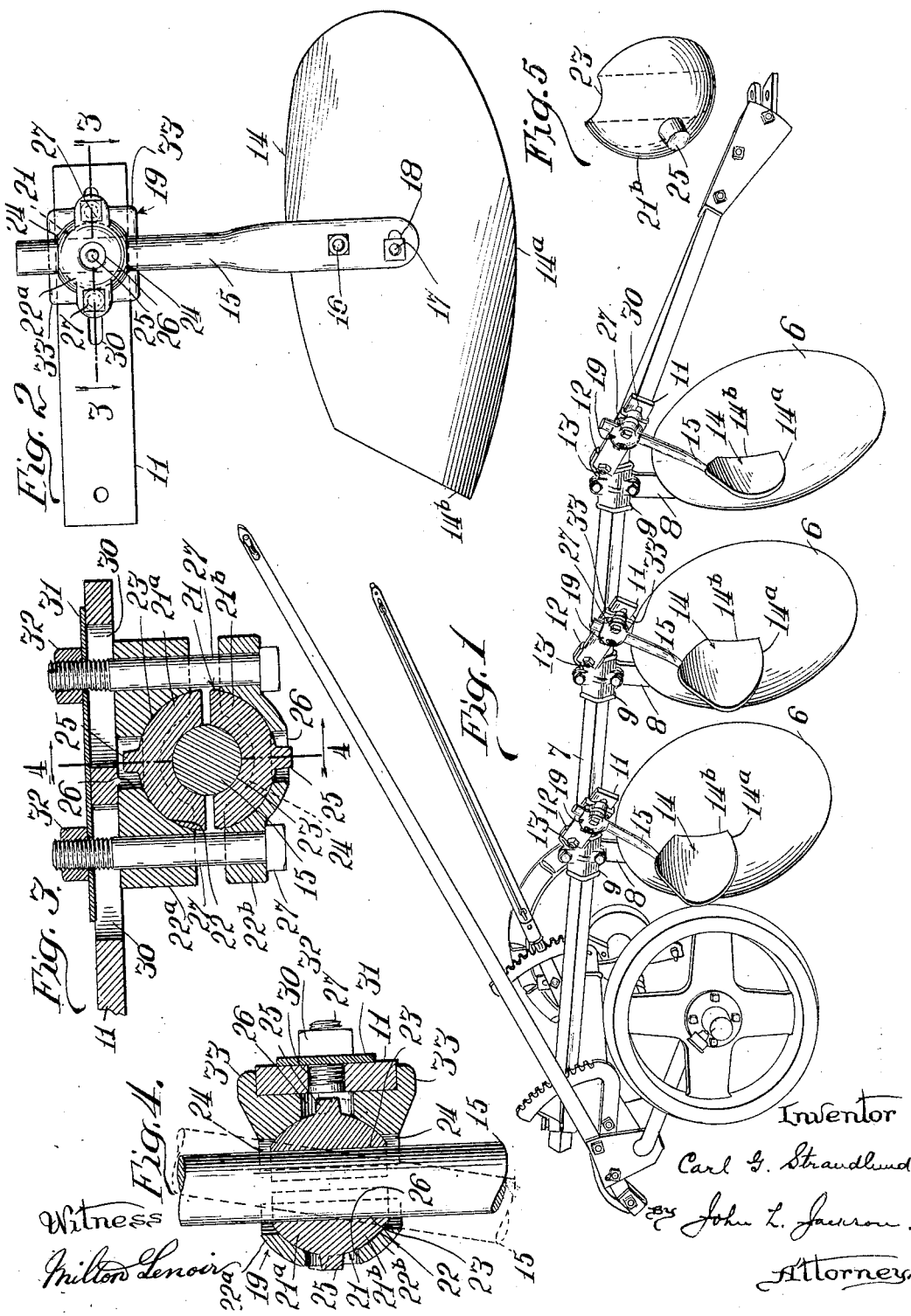

1,726,278

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

DISK-PLOW SCRAPER.

Application filed September 20, 1926. Serial No. 136,413.

My invention pertains to a universally adjustable mounting for disk plow scrapers.

In disk plow practice it is customary to associate with each plowing disk a scraping blade which lies in contact with or in immediate proximity to the front face of the disk, and which scrapes the face of the disk free of soil in the rotation of the disk, also operating at the same time to turn the soil and pulverize the same as it rolls up the face of the disk.

To obtain the most effective operation of the scraper, both from the standpoint of scouring the disk, and of turning and pulverizing the soil, the scraper must be given a fairly accurate setting relative to the plow disk, and this setting must be maintained. However, it is not practicable to mount the scraper permanently for the reason that in some soils one setting will secure the most effective scouring and turning, and in other soils a different setting will be required. Also, owing to wear of the scraper, adjustments thereof are necessary from time to time.

The prior mounting devices for holding these scrapers have been objectionable on one score or another for meeting these various requirements, and it is the object of the present invention to provide improved mounting means of this type which will overcome these objections.

The present mounting secures a greater latitude and variety of adjustments than have been obtainable with any of these prior mounting devices. For example, by virtue of the present construction, the scraper can be adjusted towards and away from the disk; inwardly and outwardly radially of the disk; vertically of the disk; and the scraper can be twisted or skewed to adjust different points of the scraping edge relative to concave face of the disk; and can be swiveled to incline the scraping edge at different horizontal angles relative to the disk.

Another noteworthy advantage of this construction is that practically all of the adjustments are obtained and held at one point. Thus there is avoided the objection of first getting one adjustment set to a nicety and then losing this adjustment in endeavoring to secure another. Practically all of the available adjustments are held by the same pair of bolts, and it is therefore possible to make all of the aforesaid vertical, radial, fore and aft, and angular adjustments at this one point and to then set all of these adjustments simultaneously by tightening up on this pair of bolts.

While my invention has been devised primarily for the mounting of disk plow scrapers, certain features thereof may be employed in other types of agricultural implements for adjustably supporting soil engaging devices.

Referring to the accompanying drawing illustrating a preferred embodiment of my invention:

Fig. 1 is a perspective view of a disk plow embodying the present universal mounting;

Fig. 2 is an elevational view of a scraper and the present mounting as viewed from the rear or disk side thereof;

Fig. 3 is a horizontal sectional view through the universal joint of the mounting, taken on the plane of the line 3—3 of Fig. 2;

Fig. 4 is a vertical sectional view through this universal joint taken on the plane of the line 4—4 of Fig. 3, and Fig. 5 is a perspective view of one of the ball sections of the universal joint.

In the typical form of disk plow illustrated in Fig. 1, a plurality of plow disks 6 are mounted on a plow beam 7, which is comparable to the frame of the implement. Each disk is rotatably supported on the lower end of a plow standard 8 comprising an upper clamping portion 9 for clamping to the plow beam or frame 7. The disks have concave front faces and are staggered in offset relation relative to the forward travel of the implement, as is customary in disk plows.

Projecting from each clamping portion 9 is a scraper supporting arm 11, the inner end of which is preferably set into an open sided socket 12 in the clamping portion 9, being secured therein by a bolt or bolts 13. The scraper 14, individual to each plow disk, is supported from the outer end of the arm 11. The scraper may be of any desired shape, but to cooperate to best advantage with the variety of adjustments afforded by the present mounting device, it is preferably shaped substantially as shown in Fig. 2, characterized by a curved lower scraping edge 14ª and an abruptly inclined inner edge 14ᵇ.

All of the adjustments may be considered as occurring between the supporting arm 11 and the scraper 14. The scraper is attached to a shank 15 by a bolt 16, around which the scraper can be swung to a limited degree. A fastening bolt 17, secured to the scraper, extends through a slot 18 in the lower part of the shank 15 and serves to clamp the scraper in any inclined position to which it has been swung in its limited pivotal movement around the pivot bolt 16. This is the only adjustment which is effected independently of the other adjustments, and which requires a separate setting and clamping. However, this adjustment is relatively small in degree and does not affect the settings given the other adjustments.

The upper end of the shank 15 is cylindrical, and this end passes up through a universal mounting block or head 19 which is carried by the supporting arm 11. As shown in Figs. 3 and 4, this mounting block or head comprises a ball and socket joint consisting of a ball 21 divided into two semi-spherical ball sections $21^a$ and $21^b$, and a spherical socket 22 divided into front and rear socket sections $22^a$ and $22^b$. One of the ball sections is illustrated in Fig. 5, from which it will be observed that it has a semi-cylindrical groove 23 extending diametrically across its inner flat face, and the grooves in both ball sections form a cylindrical bore or passageway through which extends the scraper shank 15. The shank passes out of the top and bottom of the mounting block through openings 24, which are considerably larger than the shank diameter to permit inclination of the shank in any direction, as shown in Fig. 4. The two ball sections are duplicates, and each ball section has formed thereon a small lug 25 which extends into an opening 26 formed in the adjacent socket section. These openings 26 are considerably larger than the lugs 25, thereby permitting a wide range of rocking movement of the ball, but preventing the ball sections from revolving around to a point within the socket where the clamping pressure of the socket would be ineffective for clamping the ball sections over the shank 15.

Two bolts 27 pass through apertured ears forming a part of the socket section $22^b$ and through alined openings in the rear socket section $22^a$. The ends of these bolts pass through slots 30 extending longitudinally in the scraper supporting arm 11. The threaded ends of these bolts pass freely through a spacing plate 31 engaging against the opposite side of the supporting arm 11, and receive nuts 32 by which the bolts can be drawn up for clamping the several adjustments. Referring to Fig. 4, it will be noted that the socket section $22^a$ has flanges 33 formed along its upper and lower edges, which embrace the upper and lower edges of the scraper supporting arm 11, serving as guide means for guiding longitudinal shifting adjustment of the mounting block along the supporting arm and preventing any rotating or twisting of the block relative to the arm.

By loosening the nuts 32, the clamping pressure of the mounting head is released, whereby any and all of the aforesaid adjustments can be secured at this common point. For example, to raise or lower the scraper for engaging at different vertical heights on the face of the plow disk, it is merely necessary to shift the cylindrical portion of the shank 15 up or down between the ball sections $21^a$ and $21^b$. To adjust the angle of contact of the scraping edge $14^a$ relative to the concave face of the plow disk, it is merely necessary to rotate the shank 15 axially within the ball 21. To shift the scraper fore and aft relative to the implement or to the plow disk, it is only necessary to rock the shank 15 either forwardly or backwardly through the ball and socket mounting to bring the scraping edge into the desired pressure contact or into proximity to the plow disk. To adjust the location of the scraper laterally or radially across the face of the plow disk it is only necessary to rock the shank 15 inwardly or outwardly to the desired degree through the universal mounting of the ball and socket joint. In the event that the ball and socket joint does not afford sufficient latitude of movement for a desired setting of the scraper inwardly or outwardly across the face of the plow disk, it is only necessary to shift the mounting block inwardly or outwardly along the supporting arm 11. During such shifting movement, the spacing plate 31 will hold the ends of the bolts 27 in proper spaced relation so that they cannot tilt and bind such sliding movement of the mounting block.

After any one or all of these adjustments have been obtained, such adjustments are all set or secured simultaneously by the tightening of the two bolts 27. It will be observed that the tension of these two bolts serves to clamp the ball sections in rigid clamping engagement with the shank 15, to clamp the socket sections in rigid clamping engagement with the ball, and to clamp the entire mounting block in rigid engagement with the supporting arm 11. As before stated, the provision of the lugs 25 on the ball sections for engaging in the openings 26 prevents any possibility of the ball sections accidentally revolving around to a plane where the clamping pressure of the bolts 27 would be ineffective for clamping the shank 15 between the ball sections.

What I claim as my invention and desire to secure by Letters Patent, is—

1. The combination with an implement frame having an earth working disk and a scraper carried thereby, of means for mounting said scraper comprising a spherical socket carried by the implement, and a ball in said socket, said scraper comprising a shank adjustably mounted within said ball.

2. The combination with an implement frame supporting an earth working disk, of a scraper cooperating therewith comprising a shank, a ball supporting said shank and relative to which said shank has axial rotational and longitudinally shiftable adjustments, a spherical socket relative to which said ball has universal adjustment, and a supporting arm on said implement relative to which said socket has shiftable adjustment.

3. The combination with an implement frame supporting an earth working disk, of a scraper cooperating therewith and comprising a shank, a split ball between the halves of which said shank is engaged, and a split socket within which said ball is mounted, said socket being supported on said implement.

4. The combination with an implement frame, of an arm extending therefrom, a spherical socket comprising two socket sections adjustably supported on said arm, a split ball within said socket, a disk scraper comprising a shank extending between the halves of said split ball, and bolt means associated with said socket for clamping said split ball on said shank and for clamping said socket sections on said ball.

5. The combination with an implement frame member having an earth working disk carried thereby, of a scraper for said disk having an extending shank, a socket comprising two socket sections, said socket being shiftably supported on said frame member, a ball in said socket comprising two ball sections, said shank engaging between said ball sections, and bolting means passing through said socket sections and said frame member.

6. The combination with an implement frame member and an earth working disk, of a scraper for cooperating with said disk, a shank on which said scraper is carried, said scraper comprising a lower scraping edge normally held in stationary relation to said shank, a ball and socket joint between said shank and said frame member, and means for angularly adjusting said scraper relative to said shank to raise or lower either end of said scraper edge.

7. In a disk plow, the combination of a plow beam, a plow disk supported thereon, a supporting arm extending from said plow beam having slots therein adjacent its outer end, a spherical socket comprising two socket sections, bolts passing through said socket sections and through the slots in said supporting arm, a spacing plate engaging over said bolts adjacent said arm, a ball engaging in said socket comprisng two ball sections, lugs on said ball sections engaging in openings in said socket sections for limiting rotation of said ball, a shank extending between said ball sections, a scraper pivotally supported on said shank for cooperation with said plow disk, and means for clamping said scraper in different angular positions relative to said shank.

8. The combination with an agricultural implement comprising a frame and a soil engaging device associated therewith, of mounting means for attaching said soil engaging device to said frame comprising cooperating ball and socket members arranged to provide an angular adjustment for said soil engaging device, one of said members being mounted on said frame, means adjustably supporting said soil engaging device on the other of said members to provide a secondary adjustment for said soil engaging device, and securing means common to both of said adjustments for holding the soil engaging device in its desired position.

9. The combination with an agricultural implement comprising a frame and a soil engaging device associated therewith, of mounting means for attaching said soil engaging device to said frame comprising two universal joint members adapted to provide an angular adjustment for said soil engaging device, means adjustably supporting one of said universal joint members on said frame to provide a secondary adjustment for said soil engaging device, means adjustably supporting said soil engaging device on the other of said universal joint members to provide a third adjustment for said soil engaging device, and securing means common to all three of said adjustments for holding the soil engaging device in its desired position.

10. The combination with an agricultural implement comprising a frame and a soil engaging device associated therewith, of means for mounting said soil engaging device comprising ball and socket members, one of said members being mounted on said frame, said soil engaging device comprising a shank adjustably mounted within the other of said members.

11. The combination with an agricultural implement comprising a frame and a soil engaging device associated therewith, said soil engaging device comprising a shank, of means for mounting said soil engaging device comprising a ball supporting said shank and relative to which said shank has adjustment, a spherical socket relative to which said ball has universal adjustment, and a supporting arm on said frame relative to which said socket has shiftable adjustment.

12. The combination with an agricultural implement comprising a frame and a soil engaging device associated therewith, of means for mounting said soil engaging device on said frame comprising relatively rotatable ball and socket members, one of said members being mounted on said frame, said soil engaging device being carried by the other of said members, means for clamping said members together, and a projection on one of said members engaging in a recess in the other of said members for limiting relative rotation between said members.

13. The combination with an implement frame having an earth working disk and a scraper carried by said frame, of mounting means for said scraper comprising a spherical socket member, a ball member engaging in direct contact with said socket member, means supporting said scraper on one of said members and permitting adjustment of said scraper relatively to said member, and means permitting adjustment of the other of said members relatively to the implement frame.

14. The combination with an implement frame having an earth working disk supported thereon, of a scraper for cooperating with said disk, mounting means for said scraper comprising a spherical socket member, a ball member adjustably engaging in direct frictional contact with said socket member, means supporting said scraper on said ball member and permitting adjustment of said scraper relatively to said ball member, and bolt means associated with one of said members and engaging in openings in the other of said members for adjustably supporting both of said members on said frame.

15. The combination with an implement frame having an earth working disk carried thereby, of a scraper member for cooperating with said disk, a shank member on which said scraper member is carried, universally adjustable mounting means supporting said shank member on the implement frame, a pivot bolt connecting said shank member and said scraper member, and a fastening bolt connecting said shank member and said scraper member, said fastening bolt engaging in a slot in one of said members permitting angular adjustment of the scraper member relatively to the shank member about said pivot bolt.

CARL G. STRANDLUND.